(12) United States Patent
Kasperchik

(10) Patent No.: US 8,784,550 B2
(45) Date of Patent: Jul. 22, 2014

(54) OXIDE PIGMENT DISPERSION FOR INKJET INK

(75) Inventor: Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/819,962

(22) PCT Filed: Oct. 22, 2010

(86) PCT No.: PCT/US2010/053696
§ 371 (c)(1),
(2), (4) Date: Feb. 28, 2013

(87) PCT Pub. No.: WO2012/054052
PCT Pub. Date: Apr. 26, 2012

(65) Prior Publication Data
US 2013/0160672 A1 Jun. 27, 2013

(51) Int. Cl.
*C09D 11/02* (2014.01)
(52) U.S. Cl.
USPC .................................. 106/31.65; 106/481
(58) Field of Classification Search
USPC ............................... 106/31.65, 481
See application file for complete search history.

(56) References Cited

U.S. PATENT DOCUMENTS

| | | | |
|---|---|---|---|
| 5,824,144 A | 10/1998 | He et al. | |
| 5,852,075 A * | 12/1998 | Held | 523/161 |
| 7,201,795 B2 * | 4/2007 | Takemoto et al. | 106/31.86 |
| 2002/0156155 A1 | 10/2002 | Lin | |
| 2004/0179800 A1 | 9/2004 | Walker, Jr. et al. | |
| 2006/0042509 A1 | 3/2006 | Henglein et al. | |
| 2006/0204528 A1 | 9/2006 | Nolte et al. | |
| 2008/0269054 A1* | 10/2008 | Fleute-Schlachter et al. | 504/121 |
| 2009/0056591 A1 | 3/2009 | Schmidt et al. | |
| 2012/0101222 A1* | 4/2012 | Horstman et al. | 524/588 |

FOREIGN PATENT DOCUMENTS

CN 1824710 8/2006
EP 1388550 2/2004

OTHER PUBLICATIONS

International Search Report and Written Opinion for PCT/US2010/053696 dated Jul. 12, 2011 (9 pages).

* cited by examiner

*Primary Examiner* — Kaj K Olsen
*Assistant Examiner* — Veronica F Faison

(57) ABSTRACT

An oxide pigment dispersion comprised of nano-sized particles of inorganic oxide and a reactive dispersant, and an inkjet ink based on this dispersion.

22 Claims, 2 Drawing Sheets

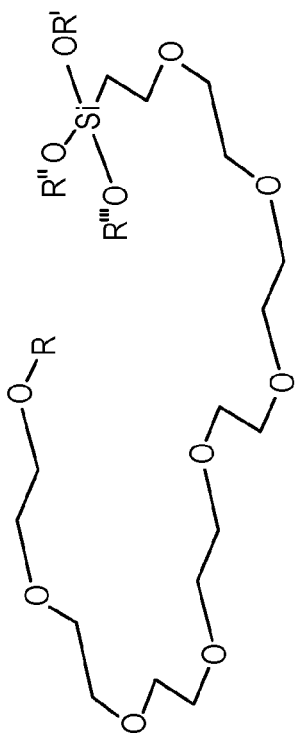
Fig. 1
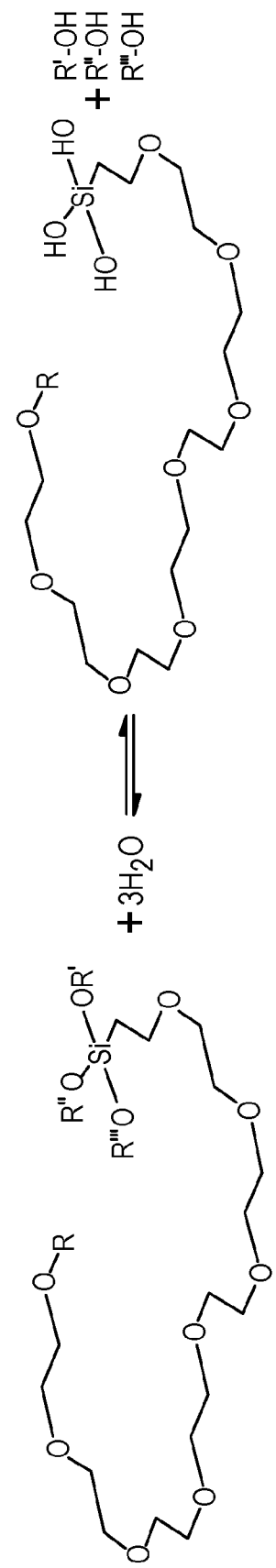
Fig. 2 - Hydrolysis of polyether alkoxysilane dispersant

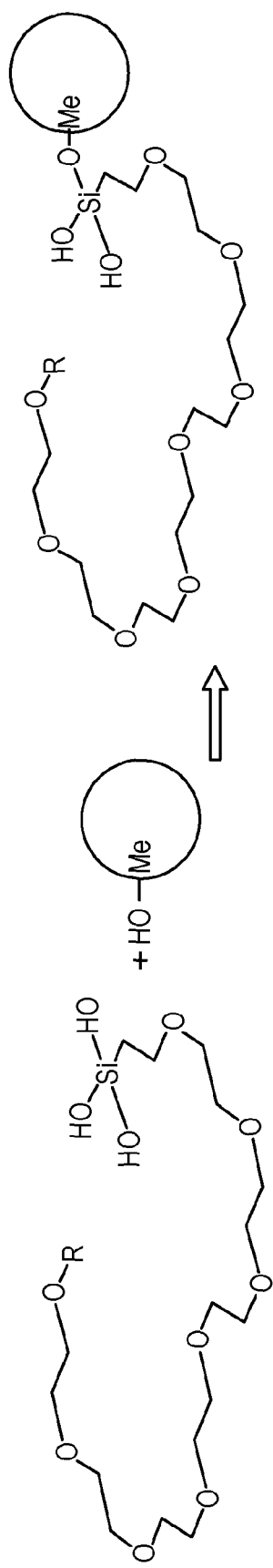
*Fig. 3* - Reaction of hydrolyzed alkoxysilane dispersant with metal oxide surface

OXIDE PIGMENT DISPERSION FOR INKJET INK

BACKGROUND

Inkjet printing is a non-contact printing process in which droplets of ink are ejected from a printhead of an ink cartridge onto a print medium to form a desired image. A typical printhead has a plurality of very small nozzles with diameters in the micron range. Metal oxides such as titanium dioxide have been used as pigments in some inkjet ink formulations such as white inks for examples. White inks are useful for providing good visibility when printed on transparent and colored surfaces. However, not all inks based on metal oxides are effective for inkjet printing as they do not meet certain requirements relating to jettability and pigment dispersability.

BRIEF DESCRIPTION OF THE DRAWINGS

FIG. 1 shows a reactive dispersant structure with polyethylene glycol (PEG) chain.

FIG. 2 shows the hydrolysis of the reactive dispersant shown in FIG. 1.

FIG. 3 shows the reaction of the hydrolyzed dispersant with a metal oxide surface.

DETAILED DESCRIPTION

Conventional ink formulations based on metal oxides with high refractive index and high density (e.g., titanium dioxide or zinc oxide) typically contain pigments with particle size in the range between 100 nm and 1.0 μm. Such ink are often considered as white ink. Formulations based on such larger pigment particle size often have serious long-term stability issues. Large, dense particles of metal oxides tend to aggregate, flocculate and settle in an aqueous dispersion. When these inks are used in inkjet printing, the settling of the pigments may lead to unrecoverable nozzle clogging and severe degradation of the print quality.

Some other inkjet applications may require printing with transparent/clear metal oxide dispersions having particle size much smaller than it is required for ink formulations, specifically for white ink formulations. Metal oxide pigments with particle size in the nano-range of 10-100 nm may show a significant degree of transparency. They can be used as additives in the inks based on conventional colorants or as primary components of specialty inkjet inks for applications out of scope of conventional printing. Formulations based on smaller particle size mineral pigment dispersions (10-100 nm) typically do not experience severe settling issues. However, reliability issues inherent in inkjet ink application of small particle metal oxide dispersions include nozzle clogging caused by evaporation of volatile ink components (i.e., "decap") and formation of insoluble pigment crust on the heater surface in the firing chambers of the thermal inkjet printhead. (The latter issue is totally inherent to thermal inkjet printing applications). As used herein, the term "decap" refers to the tendency of ink-jet inks to crust near or inside the jetting orifice at an inkjet printhead due to the evaporation of volatile solvents present in the ink. Ink-jet inks that exhibit good decap do not require the extensive use of a capping mechanism designed to prevent this type of crusting (as is the case with many inkjet inks) over reasonable periods of time, e.g., several weeks or more. Removal of the volatile components very often leads to aggregation and formation of hard crust from dispersed metal oxide particles. Mechanical durability of the crust tends to increase with decrease of the metal oxide particle size. The problem is inherent to both piezo and thermal inkjet printing technologies. Each nozzle-firing event in thermal inkjet printhead involves partial evaporation of the volatile ink components in the firing chamber. The ink is heated by microscopic heater elements (i.e., resistors) built into the firing chamber design. The layer of the ink adjacent to the resistor surface is rapidly heated to temperatures well above the boiling point of the liquid ink components. Evaporation of the volatile components leads to the formation of a gas bubble, and consequently, results in ejection of some of the ink from firing chamber. Very often, non-volatile ink components tend to precipitate during the firing on the heated surface. Elevated temperature of the resistor (up to 1000° C.) may cause the precipitated components to react with each other as well as with the resistor surface. These interactions may lead to formation of insoluble crust. If the crust formed is mechanically durable enough and is not dissipated or removed during following re-fill of the firing chamber, subsequent firing increases the crust thickness. Eventually, the crust build-up on the resistor surface interferes with the firing process itself. The growing crust acts as a heat transfer insulator, prevents rapid heating of the ink and interferes with drive bubble formation, and eventually, prevents ink ejection.

Polymeric Dispersants

Polymeric dispersants have been used in white ink formulations based on dispersions of mineral pigment such as $TiO_2$, ZnO or $AlPO_4$ with larger particle size (greater than 100 nm). The particles in the dispersion are stabilized by adsorption of water-soluble or partially water-soluble polymers and block co-polymer dispersants, typically with anionic functionalities present. These polymeric dispersants do not eliminate settling completely but they do prevent the formation of very stable particle aggregates. The inks obtained this way show "soft settling" behavior, i.e., settled particle agglomerates which can be re-dispersed easily and without unrecoverable nozzle failures in inkjet printhead.

One of the major disadvantages of mineral pigment inks with polymeric dispersants is that the particle size range is limited to 100 nm-1.0 μm, i.e. producing ink formulations with pronounced light-scattering/masking behavior. Larger particle size dispersions and inks can be stabilized with a relatively low amount of the dispersant (less than 1-3% of the pigment solids). Going to significantly smaller particle size requires a much higher Dispersant/Pigment (D/P) ratio, e.g., increasing dispersant content up to 100-200% of pigment solids. A higher content of polymeric dispersants in the ink would result in significantly higher ink viscosity. Higher viscosity inks have jetting reliability difficulties, especially from lower drop volume printhead architectures. Dispersion stabilization efficiency is improved (up to certain point) with increased dispersant chain length and, hence, molecular mass. However, the increase of dispersant molecular mass very often results in increased dispersion viscosity which negatively affects jetting reliability.

Inorganic Anion Dispersants

Other suitable dispersants for metal oxide particles are certain inorganic, anionic dispersants of oligomeric and monomeric nature such as phosphate and polyphosphate anions. Polyphosphate salts have been shown to be efficient dispersants for milling metal oxides such as $TiO_2$ from microns in particle size down to 10-20 nm. Milling metal oxides to sub-100 nm particle size with inorganic anion dispersants also requires a relatively high Dispersant: Pigment (D/P) ratio. For instance, milling $TiO_2$ down to 20 nm particle size with sodium polyphosphate requires D/P of about 0.5. Unfortunately, dispersions of fine metal oxide particles (particle size of less than 100 nm) prepared with inorganic anionic dispersants in many cases are not suitable for reliable inkjet applications for a number of reasons. Evaporation of the volatile components results in the formation of high viscosity plugs and, eventually, solid crust made from small particles in the dispersion, and consequently, nozzle clogging (decap). During printing, the intermittent nozzle plugging leads to poor drop directionality and severely degraded print quality. Continuous jetting of the inks based on these dispersions from thermal inkjet printhead leads to fast and irreversible metal oxide crust built on the resistor surface. The resistor surface contamination during continuous printing results in severe and irreversible print quality degradation.

Novel Oxide Pigment Dispersion

The present disclosure provides an oxide pigment dispersion that is capable of providing significant improvement in jettability when it is used for inkjet printing, especially thermal inkjet printing. In some examples, the oxide pigment dispersion of the present disclosure include inorganic oxide particles, such inorganic oxide particles can be made of metal oxide or of semi-metal oxide. The novel oxide pigment dispersion contains nano-sized particles ("nanoparticles") of inorganic oxide dispersed in an aqueous carrier and a specific type of reactive dispersant. The oxide nanoparticles have a mean particle size of less than about 150 nm. In some embodiments, the oxide nanoparticles have a particle size comprised between 5 and 150 nm; in some other embodiments, comprised between 5 and 100 nm; and in yet some other embodiments, comprised between 5 and 50 nm.

The inorganic oxide nanoparticles may be made of metal oxide pigment such as titanium dioxide ($TiO_2$) in rutile or anatase crystalline form, zinc oxide (ZnO), aluminum oxide ($Al_2O_3$), zirconium oxide ($ZrO_2$), indium oxide ($In_2O_3$), Cerium(IV) oxide ($CeO_2$), etc, or semi-metal oxide pigment such as silica. When these oxide pigments are ground to fine particle size of less than 100 nm, they become colorless and show a high degree of transparency. As such, the oxide pigment dispersion disclosed herein may be used to formulate colorless or clear inks that are transparent or semi-transparent when printed onto a print medium.

In some other embodiments, the inorganic oxide nanoparticles may be made of metal oxide pigment such as iron oxide. In some examples, the oxide may include wustite, magnetite, hematite, maghemite, or a combination thereof. As known, wustite represents the iron (II) oxide form, magnetite represents the iron (II, III) oxide form, and hematite and maghemite represent different phases of the iron (III) oxide form. Magnetite and hematite are oxidatively stable in aqueous environment; however, wustite (FeO) is oxidatively unstable and can readily revert to $Fe_2O_3$ or $Fe_3O_4$. In some other examples, the oxide may include ferromagnetic inorganic oxide nanoparticles, such as magnetite ($Fe_3O_4$), hematite ($Fe_2O_3$), or other compounds containing iron.

Reactive Dispersant

The reactive dispersant is a silane coupling agent containing hydrophilic functional groups. In some embodiments, the reactive dispersant is represented by the following general Formula (I):

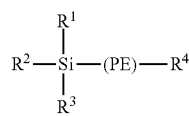

(I)

wherein a) $R^1$, $R^2$ and $R^3$ are hydroxy groups, linear or branched alkoxy groups. In some examples, at least one of the $R^1$, $R^2$ and $R^3$ are a linear or branched alkoxy group. In yet some examples, at least one of the $R^1$, $R^2$ and $R^3$ group is an alkoxy group. In some embodiments, $R^1$, $R^2$ and $R^3$ groups are small alkoxy groups, i.e. having from 1 to 5 carbon atoms. In some other embodiments, $R^1$, $R^2$ and $R^3$ groups are linear alkoxy groups having from 2 to 5 carbon atoms. In yet some other embodiments, $R^1$, $R^2$ and $R^3$ groups are —$OCH_3$ or —$OC_2H_5$.

b) PE is a polyether oligomer chain segment of the structural formula $[(CH_2)_n—CH—R—O]_m$, wherein n is an integer ranging from 0 to 3, wherein m is an integer superior or equal to 2, and wherein R is H or a chain alkyl group. In some examples, R is a chain alkyl group having 1 to 3 carbon atoms, such as $CH_3$ or $C_2H_5$. In some examples, while there is no strict limit to the number (m) of polyether units in the polyether chain (PE), m is an integer ranging from 2 to 30. In some other examples, m is an integer ranging from 3 to 30, and, in yet some other examples, m is an integer ranging from 5 to 15. Without being linked by any theory, it is believed that very long polyether chain segment may lead to significantly increased ink viscosity and negative consequences for ink jetting reliability, especially in the case of smaller drop volume inkjet printheads. Thus, in some examples, in order to be compatible with aqueous inks, polyether chain are water-soluble or hydrophilic. As examples, the polyether chain segment (PE) may be comprised of repeating units of polyethylene glycol (PEG) chain segment (—$CH_2CH_2$—O—), or polypropylene glycol (PPG) chain segment —($CH_2$—CH($CH_3$)—O—), or a mixture of both types. In some embodiments, the polyether chain segment (PE) contains PEG units (—$CH_2CH_2$—O).

c) $R^4$ is hydrogen, or a linear or a branched alkyl group. In some examples, $R^4$ is an alkyl group having from 1 to 5 carbon atoms. Without being linked by any theory, it is believed that the length/size of $R^4$ should be small enough so as not to render the dispersant molecule water-insoluble in the hydrolyzed state. The longer and more hydrophilic the polyether chain is, the higher the dispersant structure's tolerance to the length/size of $R^4$.

In some other embodiments, the reactive dispersant is a polyether alkoxysilane dispersant having the following general Formula (II):

(II)

wherein R', R", and R'" are linear or branched alkyl groups of any structure which will not hinder significantly or prevent the hydrolysis of the alkoxysilane group in an aqueous environment. In some examples, R', R", and R'" are linear alkyl groups having from 1 to 3 carbon atoms in chain length. In some other examples, R', R", and R'"—$CH_3$ or —$C_2H_5$.

$R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2, and wherein R is H or a chain alkyl group; and $R^4$ is hydrogen, or a linear or a branched alkyl group. In some examples, $R^4$ is $CH_3$ or $C_2H_5$.

Examples of suitable polyether alkoxysilanes include:

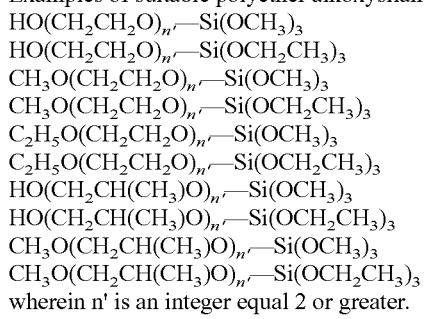

$HO(CH_2CH_2O)_{n'}—Si(OCH_3)_3$
$HO(CH_2CH_2O)_{n'}—Si(OCH_2CH_3)_3$
$CH_3O(CH_2CH_2O)_{n'}—Si(OCH_3)_3$
$CH_3O(CH_2CH_2O)_{n'}—Si(OCH_2CH_3)_3$
$C_2H_5O(CH_2CH_2O)_{n'}—Si(OCH_3)_3$
$C_2H_5O(CH_2CH_2O)_{n'}—Si(OCH_2CH_3)_3$
$HO(CH_2CH(CH_3)O)_{n'}—Si(OCH_3)_3$
$HO(CH_2CH(CH_3)O)_{n'}—Si(OCH_2CH_3)_3$
$CH_3O(CH_2CH(CH_3)O)_{n'}—Si(OCH_3)_3$
$CH_3O(CH_2CH(CH_3)O)_{n'}—Si(OCH_2CH_3)_3$ wherein n' is an integer equal 2 or greater.

In some examples, n' is an integer ranging from 2 to 30 and, in some other examples, n' is an integer ranging from 5 to 15.

An example of a reactive dispersant structure with polyethylene glycol (PEG) polyether chain is shown in FIG. 1, wherein R is H, or linear or branched alkyl group, and wherein R', R" and R'" are linear or branched alkyl groups.

Commercial examples of the polyether alkoxysilane dispersants include, but are not limited to, Silquest A-1230 manufactured by Momentive Performance Materials, and Dynasylan® 4144 manufactured by Evonik/Degussa.

When the polyether alkoxysilane dispersants are dissolved in an aqueous environment, the dispersants undergo hydrolysis whereby the alkoxysilane group is converted into reactive silanol groups as illustrated by FIG. 2. The silanol groups produced by the hydrolysis of the dispersant may react with hydroxyl groups present on metal oxide surface and attach polyether chains to the dispersed particle surface as illustrated by FIG. 3.

The weight ratio (D/P) of the reactive dispersant to the oxide pigment depends on the specific oxide particle size and the molecular weight of the dispersant. Inkjet inks based on the oxide pigment dispersion discussed above demonstrated significant improvement in jetting reliability during inkjet printing, even at very low oxide particle size (e.g., 20-30 nm) and high dispersant content (e.g., D/P up to 2.0).

Preparation of Oxide Pigment Dispersion

The oxide pigment dispersion of the present disclosure may be prepared by milling commercially available inorganic oxide pigment having large particle size (in the micron range) in the presence of the reactive dispersant described above until the desired particle size is achieved. The starting dispersion to be milled is an aqueous dispersion with solid content up to 40% by weight (wt %) of the oxide pigment. In some examples, the milling equipment is a bead mill, which is a wet grinding machine capable of using very fine beads having diameter of less than 1.0 mm as the grinding medium, for example, Ultra-Apex Bead Mills from Kotobuki Industries Co. Ltd. The milling duration, rotor speed and temperature may be adjusted as known to those skilled in the art to achieve the results desired.

Inkjet Ink Prepared from Oxide Pigment Dispersion

Inkjet inks may be prepared from the novel oxide pigment dispersion by mixing the prepared oxide pigment dispersion with an aqueous carrier and conventional ink components to form an aqueous solution with a desired oxide pigment content. To form jettable, inkjet ink, the amount of oxide pigment in the ink may be in the range of greater than 0% and up to 35% by weight. It has been discovered that even at high content of oxide pigment (e.g., 10% to 20% by weight), inkjet inks based on the oxide pigment dispersion of the present disclosure can still provide good jetting reliability, unlike conventional white inks which are capable maintaining good jetting reliability only when they contain 10% by weight or less of oxide pigment.

In some examples, the amount of oxide pigment dispersion in the finalized ink is comprised between about 0.1 and about 20 wt %, in some other examples, between about 0.2 and about 15 wt. %, and in yet some other examples, between about 0.5 and about 10 wt % based on the total weight of the ink composition.

The aqueous carrier is composed of water or mixture of water and one or more water-soluble organic solvents (so-called co-solvents or humectants). Classes of co-solvents and humectants that can be used in the ink formulation include, but are not limited to, aliphatic and aromatic alcohols, diols, glycol ethers, polyglycol ethers, caprolactams, acetamides, and the like. Examples of such compounds include primary and secondary aliphatic alcohols, 1,2-alcohols, 1,5 alcohols, ethylene glycol alkyl ethers, propylene glycol ethers, N-alkyl caprolactams, non-substituted caprolactams, formamides, acetamides and their derivatives. Specific examples of solvents that can be used include 2-pyrrolidinone, 1,5-pentanediol, trimethylolpropane, tetraethylene glycol, 1,2-hexanediol and LEG-1 (ethoxylated glycerol ether).

The ink formulation may also contain optional surfactants. A number of surfactants that can be used in the ink formulation may include alkyl and alkyl phenyl polyethylene oxides, polyethylene oxide diesters, polyethylene oxide block copolymers, polyethylene oxide amines, substituted amine oxides, and the like. The balance of the formulation may be purified water and/or other auxiliary vehicle components known in art such as biocides, viscosity modifiers, buffers for pH adjustment, sequestering agents, and the like. As to various biocides, fungicides and anti-microbial agents that may be used in the ink formulation, suitable examples include, but are not limited to, Tolcide PS75, Mergal V 133, Proxel (ICI America), Nuosept (Nudex, Inc.). Examples of buffers for pH adjustment include (but are not limited to) organic bases and their salts such as Trizma Base, MES, etc.

An exemplary colorless, semi-transparent or transparent ink composition based on the novel oxide pigment dispersion would have the following formulation, by weight: 1-10 wt % oxide pigment, 0-5 wt % surfactant(s), 0-50 wt % water-soluble organic solvent(s), and water.

The major advantages of the novel oxide pigment dispersion includes:

a) Ability to achieve stable dispersions of small pigment particle size (e.g. inorganic oxide particle size of about 20-40 nm) while maintaining good nozzle health and anti-clogging robustness when used for printing with both thermal and piezo inkjet printheads.

b) Better decap behavior as compared to dispersions made with small molecule anionic and anionic polymer dispersants such as phosphates, citrates, polyphosphates, polyacrylates and polymethacrylates.

c) No rapid print quality degradation caused by pigment crusting on firing resistor surface because the oxide pigment dispersion does not form insoluble crust on the thermal inkjet resistors even during prolonged firing.

Concentrations, amounts, and other numerical data may be expressed or presented herein in a range format. It is to be understood that such a range format is used merely for convenience and brevity and thus should be interpreted to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc.

EXAMPLES

The following examples illustrate embodiments of the present disclosure that are presently best known and provide further details in connection with what is presently deemed to be the most practical and preferred embodiments of the present disclosure. However, it should be understood that other embodiments may be practiced that are also within the scope of the present disclosure.

Example 1

The starting material was $TiO_2$ (rutile) (brand "Ti-Pure®" R-931 from DuPont). Non-milled material in water had particle size in 2-5 μm range. The $TiO_2$ powder was milled in aqueous dispersion (12 wt % load). Silquest A-1230 from Momentive Performance Materials was used as dispersant. Dispersant/Pigment ratio during milling was 0.3. The milling equipment used was Ultra Apex Mill UAM-015 from Kotobuki Industries Co., Ltd. loaded with 50 μm YTZ beads. After 3 hours of milling the volume-weighted particle diameter (Mv) of $TiO_2$ was reduced down to 115 nm.

Example 2

The starting material was $TiO_2$ (rutile) (Ti-Pure® R-931 from DuPont). Non-milled material in water had particle size in 2-5 μm range. The $TiO_2$ powder was milled in aqueous dispersion (50 wt % load). Silquest A-1230 from Momentive Performance Materials was used as dispersant. Dispersant/Pigment ratio during milling was 0.5. The milling equipment used was Ultra Apex Mill UAM-015 from Kotobuki Industries Co., Ltd. loaded with 50 μm YTZ beads. After 8 hours of milling the volume-weighted particle diameter (Mv) of TiO2 was reduced down to 35 nm.

Example 3

The starting material was $TiO_2$ (AEROXIDE® P 25 from Evonik Industries) The $TiO_2$ powder was milled in aqueous dispersion (50 wt % load). Silquest A-1230 from Momentive Performance Materials was used as dispersant. Dispersant/Pigment ratio during milling was 0.5. The milling equipment used was Ultra Apex Mill UAM-015 from Kotobuki Industries Co., Ltd. loaded with 50 μm YTZ beads. After 3 hours of milling the volume-weighted particle diameter (Mv) of $TiO_2$ was reduced down to 39 nm.

Example 4

The starting material was $TiO_2$ (MT-100HD from Tayca Corporation) The $TiO_2$ powder was milled in an aqueous dispersion (50 wt % load). Silquest A-1230 from Momentive Performance Materials was used as dispersant. Dispersant/Pigment ratio during milling was 0.5. The milling equipment used was Ultra Apex Mill UAM-015 from Kotobuki Industries Co., Ltd. loaded with 50 μm YTZ beads. After 5 hours of milling the volume-weighted particle diameter (Mv) of $TiO_2$ was reduced down to 25 nm.

Example 5

An ink was prepared based on $TiO_2$ dispersion (Mv=35 nm) made from Ti-Pure R931 $TiO_2$ (from DuPont) with Silquest A-1230 dispersant (from Momentive Performance Materials) at Dispersant/Pigment (D/P) ratio equal to 0.5. The ink has the following formulation, in weight percentage:

| | |
|---|---|
| Ti-Pure TiO2 Dispersion (12 wt. % metal oxide) | 33.33 wt. % |
| LEG-1 (ethoxylated glycerol ether) | 5.0 wt. % |
| 2-Pyrrolidinone | 9.0 wt. % |
| Trizma Base | 0.2 wt. % |
| Proxel GXL | 0.1 wt. % |
| Surfynol 465 | 0.2 wt. % |
| Water | balance |

The resulting ink contained 4 wt. % of $TiO_2$.

Printhead nozzle health test pattern was printed with this ink using HP Black Print Cartridge 94 in HP Photosmart 8450 printer. Printing was carried out until the filled cartridge was dry, and no nozzle health degradation was observed.

Example 6

Comparative Example

A comparative ink was prepared based on $TiO_2$ dispersion (Mv=22 nm) made from Ti-Pure R931 ($TiO_2$ from DuPont) with Na polyphosphate dispersant at Dispersant/Pigment ratio equal to 0.5. The ink has the following formulation, in weight percentage:

| | |
|---|---|
| Ti-Pure TiO2 Dispersion (4.26 wt. % metal oxide) | 82.16 wt. % |
| LEG-1 (ethoxylated glycerol ether) | 5.0 wt. % |
| 2-Pyrrolidinone | 9.0 wt. % |
| Trizma Base | 0.2 wt. % |
| Proxel GXL | 0.1 wt. % |
| Surfynol 465 | 0.2 wt. % |
| Water | balance. |

The resulting ink contained 3.5 wt % of TiO2.

Jetting reliability of this comparative ink was tested via printing using HP Black Print Cartridge 94 in HP Photosmart 8450 printer. The thermal inkjet printhead was rendered completely non-operational after less than 1 minute of jetting (1-page printing), and no healthy firing nozzles were left by the end of the first page printing. This nozzle failure was caused by severe resistor crusting.

The foregoing description of various embodiments of the present disclosure has been presented for purposes of illustration and description. It is not intended to be limited to the precise form or to exemplary embodiments disclosed. Numerous modifications and alternative compositions, methods, and systems may be devised by those skilled in the art without departing from the spirit and scope of the present disclosure. The appended claims are intended to cover such modifications and arrangements

The invention claimed is:

1. An oxide pigment dispersion, consisting of:
   a. inorganic oxide particles having a particle size of less than about 150 nm;
   b. a polyether alkoxysilane reactive dispersant represented by the following general Formula (I):

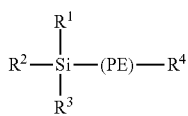

wherein R¹, R² and R³ are hydroxyl, linear or branched alkoxy groups that undergo hydrolysis in water to form a reactive silanol group that attaches to a hydroxyl group on a surface of the inorganic oxide particles; PE is a polyether oligomer chain segment of the structural formula: $[(CH_2)_n-CHR-O-]_m$, wherein n is an integer ranging from 0 to 3, wherein m is an integer superior or equal to 2, and wherein R is H or a chain alkyl group; and wherein R⁴ is hydrogen, or a linear or branched alkyl group; and c. the water.

2. The oxide pigment dispersion of claim 1, wherein the polyether alkoxysilane reactive dispersant of Formula (I), at least one of R¹, R² and R³ group is a linear or branched alkoxy group.

3. The oxide pigment dispersion of claim 1 wherein the inorganic oxide particles are made of metal oxide or semi-metal oxide.

4. An oxide pigment dispersion, consisting of:
a. inorganic oxide particles having a particle size less than about 150 nm and
b. a polyether alkoxysilane reactive dispersant represented by the following general Formula (II):

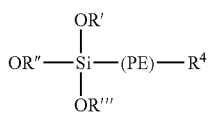

wherein R', R" and R'" are linear or branched alkyl groups that undergo hydrolysis in water to form a reactive silanol group that attaches to a hydroxyl group on a surface of the inorganic oxide particles; PE is a polyether oligomer chain segment of the structural formula: $[(CH_2)_n-CHR-O-]_m$, wherein n is an integer ranging from 0 to 3, wherein m is an integer superior or equal to 2, and wherein R is H or a chain alkyl group having from 1 to 3 carbon atoms; and R⁴ is H or a linear or branched alkyl group having from 1 to 5 carbon atoms; and c. the water.

5. The oxide pigment dispersion of claim 4, wherein R', R" and R'" are linear or branched alkyl groups having from 1 to 3 carbon atoms in chain length.

6. The oxide pigment dispersion of claim 1, wherein m is an integer from 2 to 30.

7. The oxide pigment dispersion of claim 1, wherein R⁴ is $CH_3$ or $C_2H_5$.

8. The oxide pigment dispersion of claim 1, wherein PE is a polyethylene glycol (PEG) chain segment ($-CH_2CH_2-O-)_m$, or a polypropylene glycol (PPG) chain segment ($-CH_2-CH_2-CH_2-O-)_m$, or a mixture thereof.

9. The oxide pigment dispersion of claim 1, wherein PE is a PEG chain ($-CH_2CH_2-O-)_m$ and m is an integer from 2 to 30.

10. The oxide pigment dispersion of claim 4, wherein the inorganic oxide particles are made of metal oxide or semi-metal oxide.

11. The oxide pigment dispersion of claim 1, wherein the inorganic oxide particles have the particle size in the range of about 5 nm to about 100 nm.

12. An ink for inkjet printing, the ink comprising:
the oxide pigment dispersion of claim 1;
an aqueous carrier including water and at least one water soluble organic co-solvent; and
a surfactant;
wherein an amount of the at least one water soluble organic co-solvent in the ink is greater than 0% and up to 50%, an amount of the surfactant in the ink is greater than 0% and up to 5%, an amount of metal oxide particles in the ink is the range of greater than 0% and up to 20% by weight, and a balance of the ink is the water.

13. An ink for inkjet printing, the ink comprising:
the oxide pigment dispersion of claim 4;
an aqueous carrier including water and at least one water soluble organic co-solvent; and
a surfactant;
wherein an amount of the at least one water soluble organic co-solvent in the ink is greater than 0% and up to 50%, an amount of the surfactant in the ink is greater than 0% and up to 5%, an amount of metal oxide particles in the ink is the range of greater than 0% and up to 35% by weight, and a balance of the ink is the water.

14. A method for making an oxide pigment dispersion, said method comprising:
forming a mixture consisting of an inorganic oxide pigment, water, and a polyether alkoxysilane reactive dispersant to form a starting aqueous dispersion, said polyether alkoxysilane reactive dispersant having the following general Formula II:

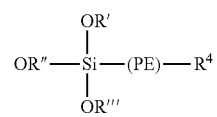

wherein
a) R', R" and R'" are linear or branched alkyl groups;
b) PE is a polyether oligomer chain segment of the structural formula: $[(CH_2)_n-CHR-O-]_m$, wherein n is an integer ranging from 0 to 3, wherein m is an integer superior or equal to 2, and wherein R is H or a chain alkyl group having from 1 to 3 carbon atoms;
c) R⁴ is H or a linear or branched alkyl group having from 1-5 carbon atoms; and
milling the aqueous starting dispersion to reduce the particle size of the inorganic oxide pigment;
whereby the polyether alkoxysilane reactive dispersant dissolve in the water and undergo hydrolysis to form a hydrolyzed polyether alkoxysilane reactive dispersant having a silanol group that reacts with a hydroxyl group on the inorganic oxide pigment to attach the hydrolyzed polyether alkoxysilane reactive dispersant to the inorganic oxide pigment.

15. The method of claim 14, wherein milling is carried out in a bead mill provided with fine beads having diameter of less than 1.0 mm as the grinding medium.

16. The oxide pigment dispersion of claim 4, wherein m is an integer from 2 to 30.

17. The oxide pigment dispersion of claim 4, wherein R⁴ is $CH_3$ or $C_2H_5$.

18. The oxide pigment dispersion of claim 4, wherein PE is a polyethylene glycol (PEG) chain segment ($-CH_2CH_2-O-)_m$, or a polypropylene glycol (PPG) chain segment ($-CH_2-CH_2-CH_2-O-)_m$, or a mixture thereof.

19. The oxide pigment dispersion of claim 4, wherein PE is a PEG chain ($-CH_2CH_2-O-)_m$ and m is an integer from 2 to 30.

20. The metal oxide pigment dispersion of claim 4, wherein the inorganic oxide particles have the particle size in the range of about 5 nm to about 100 nm.

21. The oxide pigment dispersion of claim 4, wherein $R^4$ is H.

22. The oxide pigment dispersion of claim 1 wherein a ratio of the polyether alkoxysilane reactive dispersant to the inorganic oxide pigments ranges from 0.3 to 2.0.

\* \* \* \* \*

UNITED STATES PATENT AND TRADEMARK OFFICE
CERTIFICATE OF CORRECTION

PATENT NO. : 8,784,550 B2  
APPLICATION NO. : 13/819962  
DATED : July 22, 2014  
INVENTOR(S) : Vladek Kasperchik Page 1 of 1

It is certified that error appears in the above-identified patent and that said Letters Patent is hereby corrected as shown below:

IN THE CLAIMS:

In column 11, line 8, in Claim 20, after "The" delete "metal".

Signed and Sealed this
Thirteenth Day of January, 2015

Michelle K. Lee
*Deputy Director of the United States Patent and Trademark Office*